United States Patent
Maezawa et al.

(10) Patent No.: US 9,288,358 B2
(45) Date of Patent: Mar. 15, 2016

(54) DOCUMENT MANAGEMENT SYSTEM, DOCUMENT MANAGEMENT DEVICE, AND NON-TRANSITORY COMPUTER READABLE MEDIUM

(71) Applicant: FUJI XEROX CO., LTD., Tokyo (JP)

(72) Inventors: Toshiyuki Maezawa, Yokohama (JP); Fumihisa Suzuki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/538,356

(22) Filed: Nov. 11, 2014

(65) Prior Publication Data

US 2015/0215487 A1    Jul. 30, 2015

(30) Foreign Application Priority Data

Jan. 30, 2014    (JP) ................. 2014-016214

(51) Int. Cl.
*H04N 1/04*    (2006.01)
*H04N 1/21*    (2006.01)

(52) U.S. Cl.
CPC .............. *H04N 1/04* (2013.01); *H04N 1/2166* (2013.01)

(58) Field of Classification Search
CPC .............................. H04N 1/04; H04N 1/2166
USPC ........................................ 358/1.9, 1.13, 474
See application file for complete search history.

(56) References Cited

U.S. PATENT DOCUMENTS

| | | | | |
|---|---|---|---|---|
| 9,076,126 B2* | 7/2015 | Riviello | ................. | G06Q 10/10 |
| 2003/0002068 A1* | 1/2003 | Constantin et al. | .......... | 358/1.15 |
| 2006/0274369 A1 | 12/2006 | Yamamoto | | |
| 2009/0108080 A1 | 4/2009 | Meyer et al. | | |
| 2011/0241824 A1 | 10/2011 | Uesugi | | |

FOREIGN PATENT DOCUMENTS

| | | |
|---|---|---|
| CN | 103400098 A | 11/2013 |
| JP | 8-172514 A | 7/1996 |
| JP | 2003-30209 A | 1/2003 |
| JP | 2005-165795 A | 6/2005 |
| JP | 2007-13934 A | 1/2007 |
| JP | 2009-188618 A | 8/2009 |
| JP | 2009-294792 A | 12/2009 |
| JP | 2011-211880 A | 10/2011 |
| JP | 2013-26839 A | 2/2013 |
| WO | 2013068767 A1 | 5/2013 |

OTHER PUBLICATIONS

Office Action dated Nov. 18, 2014 issued by Japanese Patent Office in counterpart Japanese Patent Application No. 2014-016214.
Communication dated Nov. 27, 2015 issued by Australian Intellectual Property Office in counterpart Australian Patent Application No. 2014268149.

* cited by examiner

*Primary Examiner* — Houshang Safaipour
(74) *Attorney, Agent, or Firm* — Sughrue Mion, PLLC

(57) ABSTRACT

A document management system includes an image reading unit, an image data dividing unit, an information acquisition unit, and a process unit. The image reading unit reads images of a plurality of documents and generates read image data of the plurality of documents. The image data dividing unit divides the read image data, and generates image data for respective documents included in the plurality of documents. The information acquisition unit acquires information relating to the plurality of documents. The process unit associates the information acquired by the information acquisition unit with the respective image data for the respective documents.

12 Claims, 10 Drawing Sheets

*FIG. 7*

| DOCUMENT DATA NO | DOCUMENT DATA | EXPENSE ITEM INFORMATION |
|---|---|---|
| 1 | (DIVIDED IMAGE DATA OF RECEIPT) | TRANSPORTATION FEE |
| 2 | (DIVIDED IMAGE DATA OF RECEIPT) | TRANSPORTATION FEE |
| 3 | (DIVIDED IMAGE DATA OF RECEIPT) | TRANSPORTATION FEE |
| 4 | (DIVIDED IMAGE DATA OF RECEIPT) | TRANSPORTATION FEE |

DOCUMENT MANAGEMENT SYSTEM, DOCUMENT MANAGEMENT DEVICE, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-016214 filed on Jan. 30, 2014.

BACKGROUND

Technical Field

The present invention relates to a document management system, a document management device, and a non-transitory computer readable medium.

SUMMARY

According to an aspect of the invention, it provides a document management system including: an image reading unit that reads images of a plurality of documents and generates read image data of the plurality of documents; an image data dividing unit that divides the read image data, and generates image data for respective documents included in the plurality of documents; an information acquisition unit that acquires information relating to the plurality of documents; and a process unit that associates the information acquired by the information acquisition unit with the respective image data for the respective documents.

BRIEF DESCRIPTION OF THE DRAWINGS

Exemplary embodiment(s) of the present invention will be described in detail based on the following figures, wherein

FIG. 7 is a diagram illustrating an example of information stored in a data storage unit of a server apparatus;

DETAILED DESCRIPTION

Hereinafter, with reference to the accompanying drawings, embodiments of the invention are described in detail.

Figure 1:
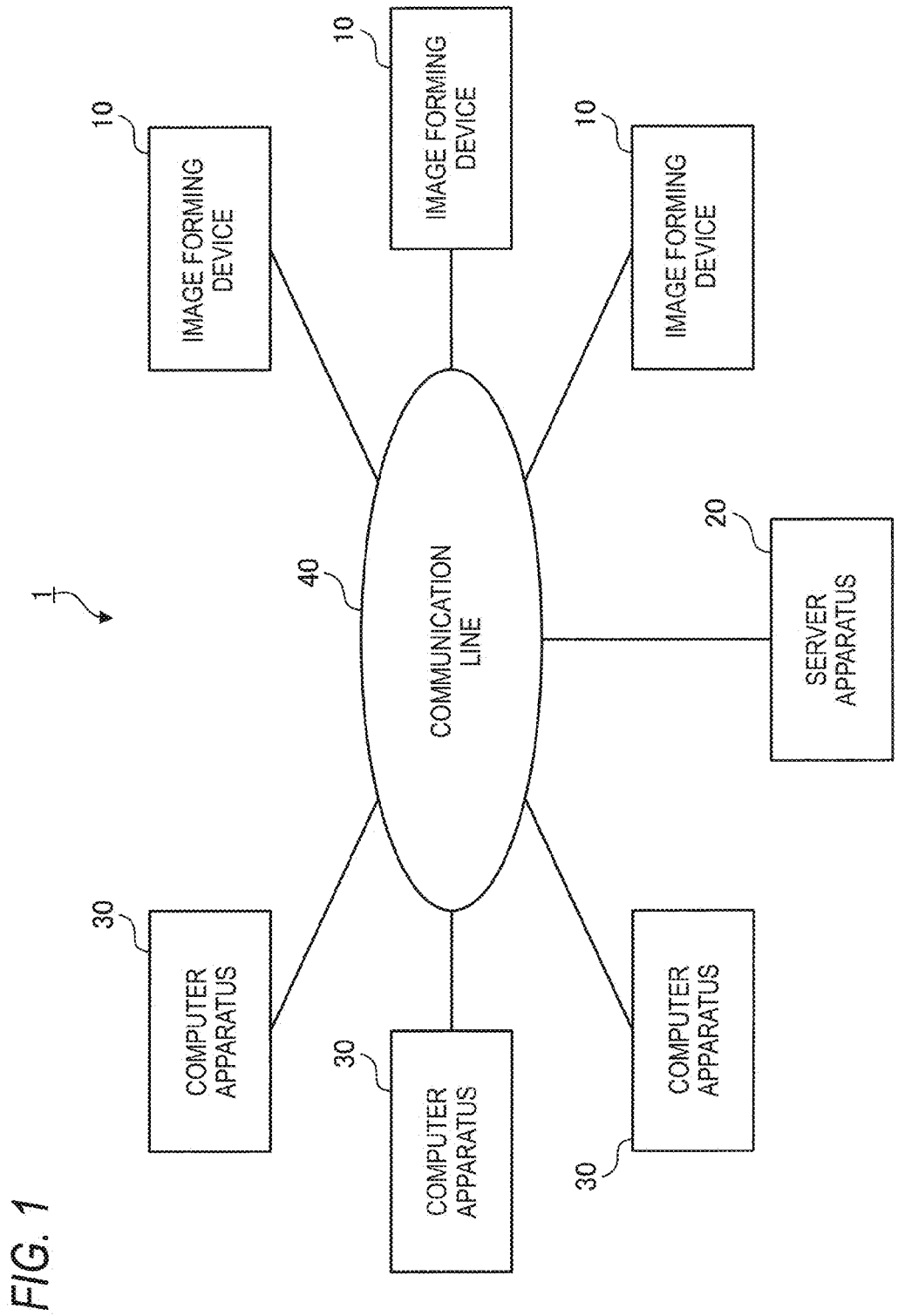
FIG. 1 is a diagram illustrating an entire configuration of a receipt managing system according to an embodiment.

FIG. 1 is a diagram illustrating an entire configuration of a receipt managing system according to the embodiment.

Plural image forming devices 10 are provided in a receipt managing system 1 according to the embodiment. Each of the image forming devices 10 includes a copy function, a function of generating document image data obtained by reading a document, and a function of forming an image on paper. Here, each of the image forming devices 10 is installed in a convenience store or an office.

Further, the receipt managing system 1 includes a server apparatus 20 that performs a process relating to a receipt which is an example of the document, and the plural computer apparatuses 30. Here, the image forming devices 10, the server apparatus 20, and the computer apparatuses 30 are connected to communication lines 40, and perform communication with each other through the communication lines 40. In addition, in the description below, an example of the process with respect to the receipt is described. However, the receipt is an example, and a process which is the same as the process for the receipt can be performed for other documents in addition to the receipt.

Figure 2:
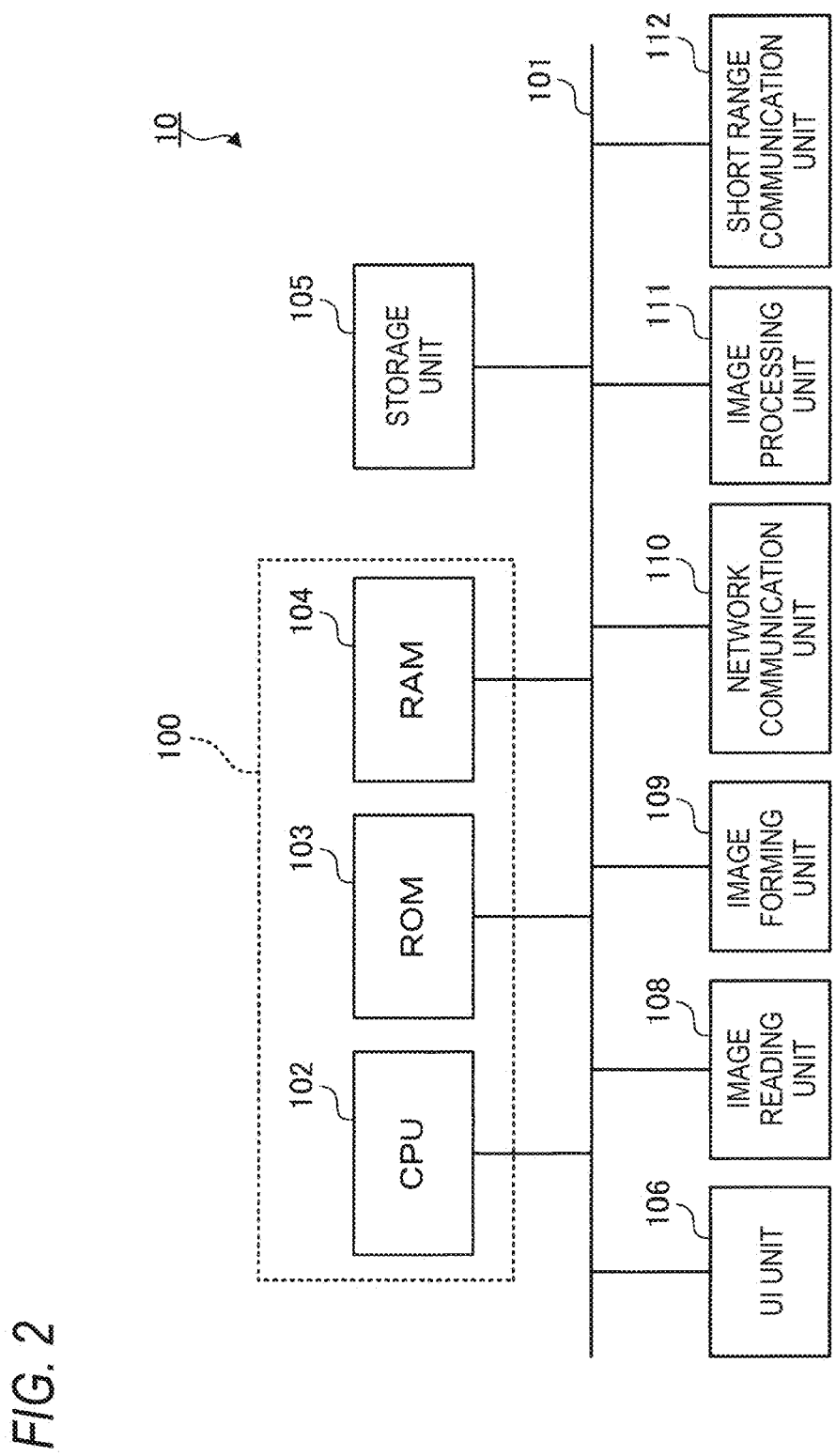
FIG. 2 is a block diagram illustrating an example of a hardware configuration of an image forming device.

FIG. 2 is a block diagram illustrating an example of a hardware configuration of the image forming device 10.

As illustrated in FIG. 2, the respective units of the image forming device 10 are connected to a bus 101, and perform data transmission and reception through the bus 101.

A user interface (UI) unit 106 includes a monitor (not illustrated), and displays information to a user. Additionally, the UI unit 106 receives information input by the user. The UI unit 106 is configured with, for example, a touch panel-type monitor that outputs a control signal corresponding to a pressed position. Additionally, the UI unit 106 is configured with, for example, a monitor and a hardware key.

An image reading unit 108 is configured with a so-called scanning device, reads an image formed by a document (copy) set by the user, and generates image data. In addition, the generated image data are output to, for example, an image processing unit 111.

An image forming unit 109 uses an electrophotographic method, and forms a toner image corresponding to the image data on a recording material such as a paper. In addition, the method is not limited to the electrophotographic method, and the image may be formed by using an ink jet method.

A network communication unit 110 functions as a communication interface that performs communication with other devices connected to the communication line 40.

A short range communication unit 112 includes a transmission and reception unit such as an antenna, and performs communication with a mobile phone terminal or a tablet terminal (hereinafter, the mobile phone terminal or the tablet terminal is referred to as "portable terminal") positioned near the transmission and reception unit. In addition, in the communication between the short range communication unit 112 and the portable terminal, for example, near field communication (NFC) or infrared light is used.

The image processing unit 111 performs an image process such as color correction and gradation correction on the input image data. The image data subjected to the image process by the image processing unit 111 are output to, for example, the image forming unit 109.

A storage unit 105 is configured with a storage device such as a hard disk device, and stores, for example, the data received by the network communication unit 110 and the image data generated by the image reading unit 108.

A control unit 100 includes a central processing unit (CPU) 102, a read only memory (ROM) 103, and a random access memory (RAM) 104. The ROM 103 stores a control program executed by the CPU 102. The CPU 102 reads the control program stored in the ROM 103, and executes the control program using the RAM 104 as a working area. If the control program is executed by the CPU 102, the respective units of the image forming device 10 are controlled by the CPU 102, and the image forming device 10 forms the image on the paper, reads the image on the document, and communicates with other devices.

In addition, forms of providing the control program include a form in which the control program is provided in a state of being stored in the ROM 103 in advance, and loaded on the RAM 104. Further, when the rewritable ROM 103 such as EEPROM is included, after the CPU 102 is set, only the program is installed in the ROM 103, and loaded on the RAM 104. Additionally, the control program is transmitted through the network such as the Internet, and the control program is installed in the ROM 103 and also loaded on the RAM 104. Moreover, the control program may be loaded from an external recording medium such as a DVD-ROM or a flash memory to the RAM 104.

Figure 3:
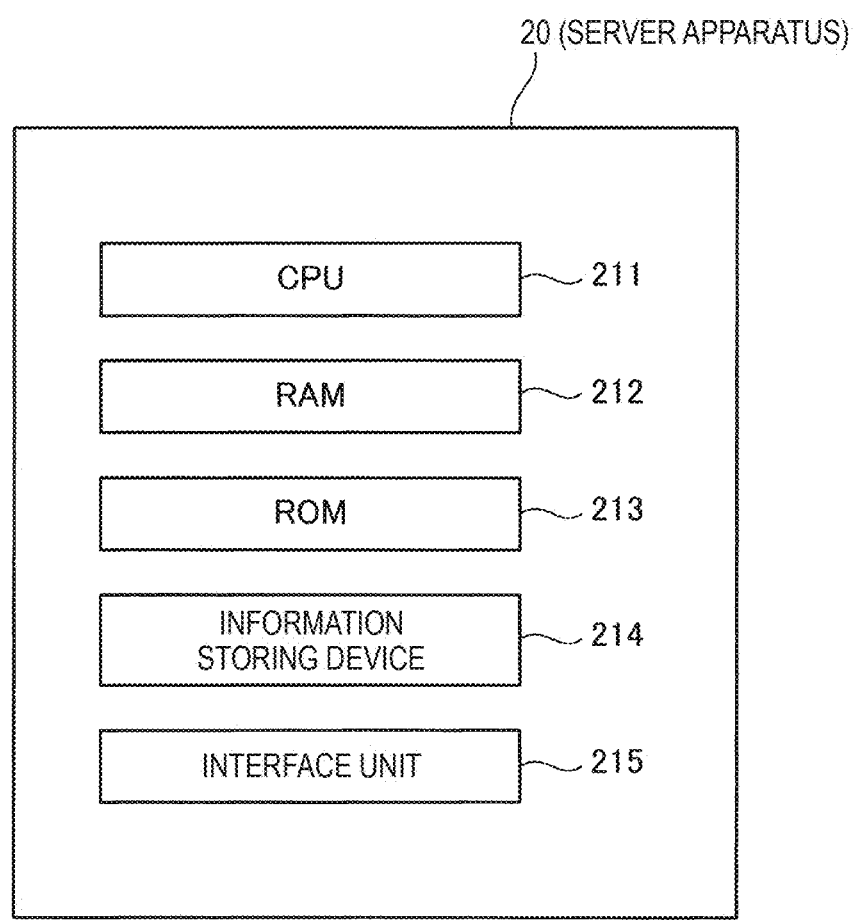
FIG. 3 is a block diagram illustrating an example of a hardware configuration of a server apparatus.

FIG. 3 is a block diagram illustrating an example of a hardware configuration of the server apparatus 20.

The server apparatus 20 as an example of a document management device includes a CPU 211 that performs an arithmetic process according to the predetermined process program, a RAM 212 that is used as a working memory of the CPU 211, a ROM 213 that stores various kinds of setting values used in processes on the CPU 211, an information storing device 214 configured with a hard disk device or the like, and an interface (I/F) unit 215 that controls input and output of signals with external equipment.

In the server apparatus 20, the CPU 211 reads the control program stored in the ROM 213, the RAM 212 is used as the working area, and the control program is executed. Respective functional units described below are realized according to this.

In addition, forms of providing the process program include a form in which the process program is provided in a state of being stored in a ROM 213 in advance, and loaded on a RAM 212, as described above. Further, when the rewritable ROM 213 such as EEPROM is included, after the CPU 211 is set, only the program is installed in the ROM 213, and loaded on the RAM 212. Additionally, the control program is transmitted through the network such as the Internet, and the control program is installed in the ROM 213 and also loaded on the RAM 212. Moreover, the control program may be loaded from an external recording medium such as a DVD-ROM or a flash memory to the RAM 212.

Figure 4:
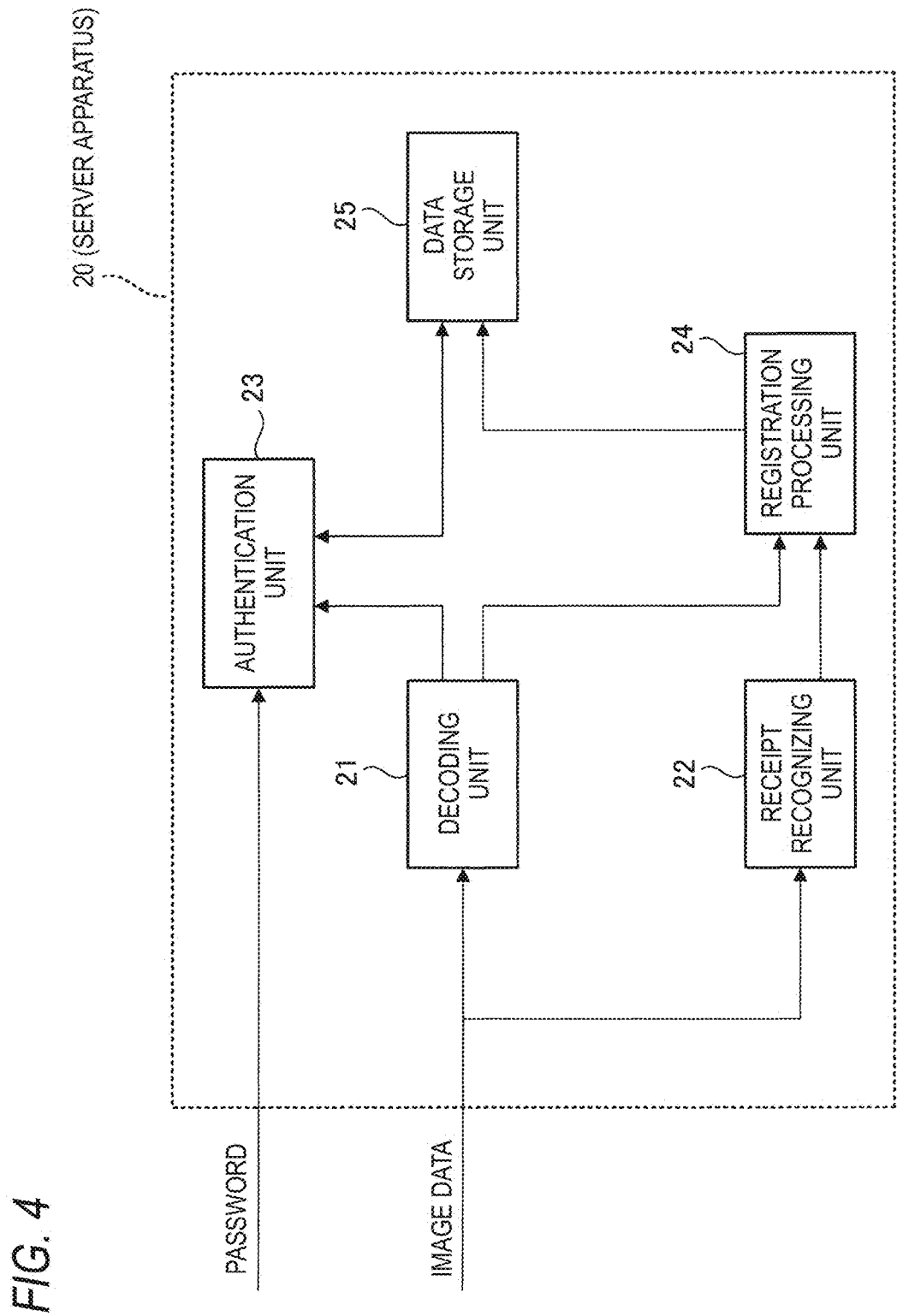
FIG. 4 is a functional block diagram illustrating a server apparatus.

FIG. 4 is a functional block diagram illustrating the server apparatus 20.

The server apparatus 20 includes a decoding unit 21, a receipt recognizing unit 22, an authentication unit 23, a registration processing unit 24, and a data storage unit 25.

The decoding unit 21 performs a decoding process of a code image included in the image data.

The receipt recognizing unit 22 recognizes the image data of the receipt included in the image data, and also divides the image data so that image data for respective receipts are generated.

The authentication unit 23 performs a process of authenticating whether the user has predetermined authority based on a password obtained by the user.

The registration processing unit 24 associates the information obtained by the decoding process of the decoding unit 21 with the image data for respective receipts which are obtained by the division process of the receipt recognizing unit 22, and the image data and the information in the data storage unit 25.

The data storage unit 25 is configured with the information storing device 214 illustrated in FIG. 3, and stores information relating to the receipt or the like.

Figure 5:
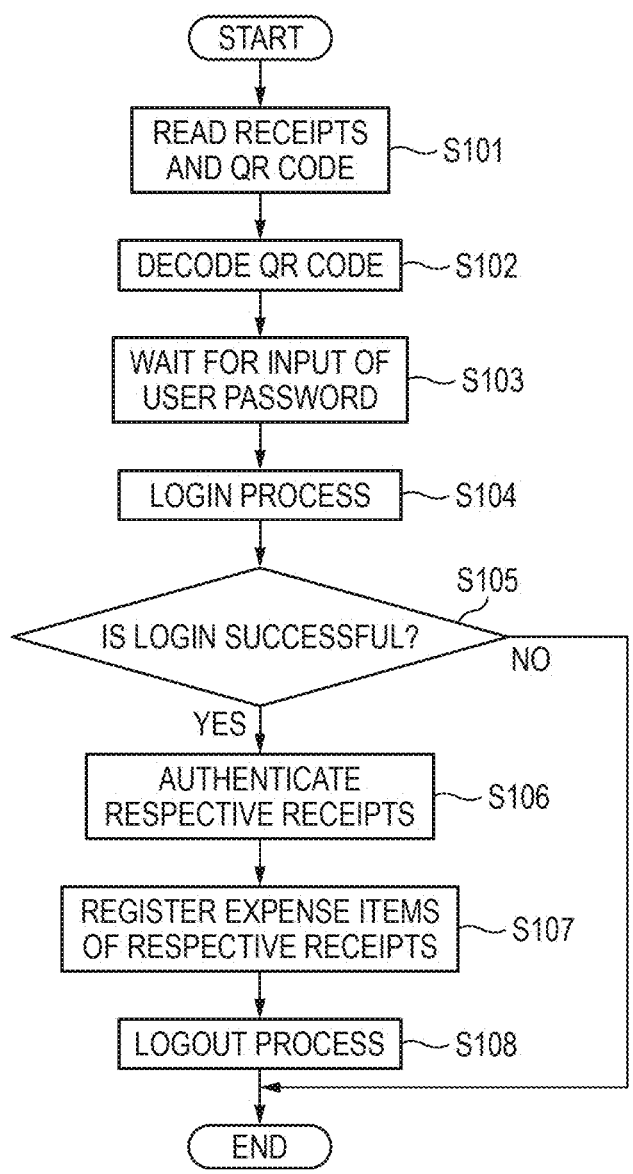
FIG. 5 is a diagram illustrating an example of a flow of a process performed in a receipt managing system according to the embodiment.

FIG. 5 is a diagram illustrating an example of a flow of a process performed in the receipt managing system 1 according to the embodiment.

The receipt managing system 1 according to the embodiment reads the plural receipts and the plural QR codes (registered trademark) with the image reading unit 108 (see FIG. 2) provided in the image forming device 10 during one time of scanning (Step 101).

The method is described in detail with reference to FIG. 6 (a diagram illustrating details of the process of Step 101 in FIG. 5). According to the embodiment, when the receipt is read, plural receipts can be inserted into a clear file, and then the receipts are read. In other words, the clear file is formed by overlapping two rectangular transparent sheets (2 sheet-shaped transparent base materials), and the receipt is read in a state in which the plural receipts are interposed between the two sheets. If it is more specifically described, the plural of receipts are fixed to the sheet positioned at the back of the receipts either of two sheets, and then the receipts are read. Therefore, according to the embodiment, the plural receipts are collectively read.

Figure 6:
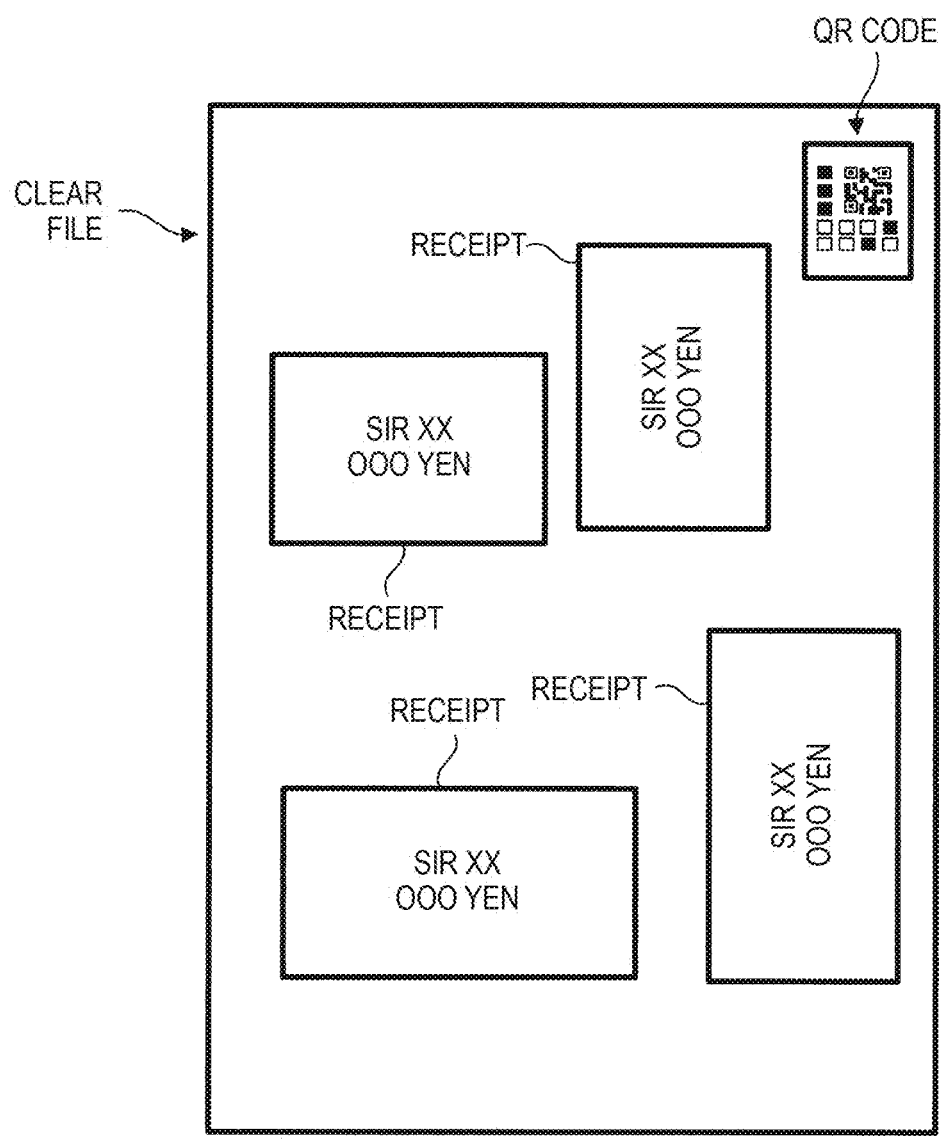
FIG. 6 is a diagram illustrating details of a process of Step 101 in FIG. 5.

Further, according to the embodiment, as illustrated in FIG. 6, a QR code as an example of an information storing image is attached to the clear file, and the QR code is also read by the image reading unit 108 of the image forming devices 10. Here, the QR code is attached to the clear file in advance.

Here, information on an "expense item" is stored in advance in the QR code. More specifically, information on the "expense item" such as "transportation fee", "accommodation fee", or "food expense" (hereinafter it may be referred to as "expense item information") which is used when dividing the receipts by kind is stored. Further, a user name is stored in the QR code. Additionally, a user ID (identification information used for identifying the user) as an example of information for authentication is stored in the QR code.

In addition, according to the embodiment, the case where the QR code is used is described as an example, but other kinds of code images such as a barcode in the related art may be used. Additionally, as long as the information such as the expense item information can be checked, other images in addition to the code image may be used.

Further, according to the embodiment, a case where the receipts are accommodated in the clear file is described as an example, but the receipts may be fixed by attachment or the like to the mounting paper (sheet-shaped base material), and the mounting paper may be read by the image reading unit 108 of the image forming devices 10.

Here, if a method of attaching the QR code to the clear file or the mounting paper is described, the QR code can be put in the clear file or the mounting paper by attaching a seal on which the QR code is printed on the clear file or the mounting paper. Additionally, for example, the QR code may be attached to the clear file or the mounting paper by directly printing the QR code on the clear file or the mounting paper.

Additionally, when the clear file is used, it is desirable to cause a background color of the receipt to be a different color from the receipt by causing a color of the sheet positioned only at the back of the receipt (one sheet among two sheets) to be a different color from the color of the receipt, such as black. If it is specifically described, the clear file is formed in a state in which two sheets are overlapped as described above, and the receipt is generally formed to be white or a color close to white. In this case, it is desirable that the color of one sheet be black or the like.

In the embodiment, the division process of the image data is performed so that the image data for respective receipts are generated (details are described below), but at this point, if the color of one sheet is black or the like, the respective receipts can be easily recognized, and the precision of the division process increases. In addition, for the same reason, it is desirable that the mounting paper be a color different from the color of the receipt, such as black.

Flows of the process are described with reference to FIG. 5.

In the process of Step 101, if the receipts and the QR code are read, the image data of the receipts and the QR code are transmitted to the server apparatus 20. Then, in the server apparatus 20, the QR code is decoded (analyzed) by the decoding unit 21 (see FIG. 4) functioning as an information acquisition unit (Step 102 of FIG. 5), and the expense item information, the user name, and the user ID are acquired.

Subsequently, in the embodiment, the image forming device 10 waits for input of the password by the user (Step 103). Then, if the user inputs the password through the UI unit 106 of the image forming device 10 (see FIG. 2), the password is transmitted to the server apparatus 20, and the authentication unit 23 of the server apparatus 20 (see FIG. 4) performs a login process (Step 104).

Here, the user ID and the password are stored in advance in the data storage unit 25 of the server apparatus 20 (see FIG. 4) in a state of being associated with each other. The authentication unit 23 of the server apparatus 20 acquires the password corresponding to the user ID obtained by decoding the QR code, from the data storage unit 25.

Then, the authentication unit 23 compares the password acquired from the data storage unit 25 with the password input by the user through the UI unit 106 of the image forming device 10. Then, the authentication unit 23 performs the login process when both passwords are identical. Meanwhile, if both passwords are not identical, the login process is not performed.

Then, in the embodiment, if the login process is not performed (No in Step 105), the process ends as it is. In addition, in this case, for example, the fact that the login cannot be performed is transmitted to the image forming device 10, and the fact that the login cannot be performed is transmitted to the user through the UI unit 106 of the image forming device 10.

Meanwhile, if the login process is performed (Yes in Step 105), the processes subsequent to Step 106 are performed.

In the processes of Step 106, the receipt recognizing unit 22 of the server apparatus 20 as an example of an image data dividing unit (see FIG. 4) performs a process of recognizing the respective receipts, and also the image data are divided so that the image data for respective receipts are generated. Accordingly, the image data for respective receipts are generated.

Here, if the receipts are read, outlines of the receipts are presented as shadows. The respective receipts can be recognized by using the shadows, and the image data are divided. Additionally, the division can be performed by a technique in the related art. For example, existing area division algorithms (graph cut and the like) are used.

Subsequently, in the server apparatus 20, the registration processing unit 24 as an example of a process unit (see FIG. 4) associates each of the plural image data obtained by the process of Step 106 (respective image data for respective receipts), with the expense item information obtained by the decoding process of Step 102, and performs a process of registering the image data and the expense item information (Step 107). In other words, the image data and the expense item information are associated, and the image data and the expense item information are stored in the data storage unit 25.

Thereafter, according to the embodiment, the image forming device 10 is operated by the user, and a logout instruction is performed. Accordingly, the logout process is performed in the server apparatus 20 (Step 108). Accordingly, a series of processes end.

FIG. 7 is a diagram illustrating an example of the information stored (registered) in the data storage unit 25 of the server apparatus 20.

Numbers for identifying the respective image data (see "DOCUMENT DATA NO" in FIG. 7) are associated with the respective image of the respective receipts obtained by dividing the image data. Further, the expense item information is associated with the respective image data of the respective receipts. In addition, the "transportation fee" is provided as an example of the expense item information.

Here, in the related art, an operation of electronizing the receipts requires manually setting receipts one by one on the scanning device to read the receipts, and therefore a lot of labor is required. Further, an operation in which one piece of read data is associated with one item of information is required in order to associate the respective read data with the respective items of information such as the expense item information, and therefore this case also requires a lot of labor.

Further, the receipt has to be set on a document glass of the scanning device in order to read the receipts, but the receipt may move or be blown by the wind at this point. Further, an operable document pressing plate is provided in the scanning device in some cases, but the receipt may move or be blown when the pressing plate is open or closed.

In contrast, in the embodiment, the plural receipts are collected by using the clear file or the mounting paper, and then the receipts are read. In this case, since the receipts do not have to be read one by one, the burden of the operator is reduced. Further, in the embodiment, since expense item information of the plural of read data can collectively be registered, the burden of the operator is reduced in this regard. Additionally, since the receipts are fixed on the clear file or the mounting paper, and then the receipts are read, the burden of setting the receipts on the scanning device is reduced.

Next, another process example in the receipt managing system 1 is described.

Figure 8:
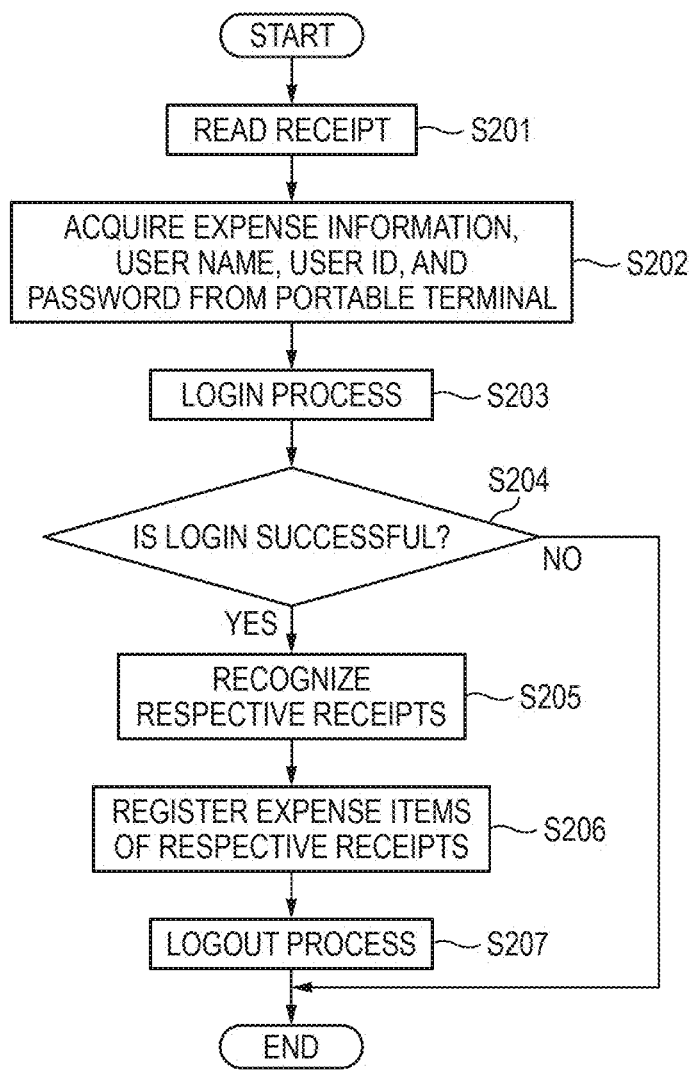
FIG. 8 is a diagram illustrating another process example in the receipt managing system.

FIG. 8 is a diagram illustrating another process example in the receipt managing system 1.

In the process, the image forming device 10 first reads the receipts (Step 201). Here, with respect to the reading, as described above, the plural receipts are received in the clear file, and the plural receipts are read.

Subsequently, the image forming device 10 acquires the expense item information, the user name, the user ID, and the password from the portable terminal operated by the user (Step 202). In addition, this acquisition is performed by the short range communication unit 112 of the image forming device 10 functioning as the information acquisition unit (see FIG. 2). The expense item information, the user name, the user ID, and the password are stored in advance in the portable terminal operated by the user, and the expense item information, the user name, the user ID, and the password are acquired from the portable terminal in Step 202.

Thereafter, the image data (the image data of the receipt) obtained in Step 201 and the expense item information, the user name, the user ID, and the password obtained in Step 202 are transmitted to the server apparatus 20. Then, the login process is performed in the server apparatus 20 as in Step 104 described above (Step 203). Then, if the login process ends in failure (No in Step 204), the process ends as it is. Meanwhile, if the login process is successful (Yes in Step 204), processes subsequent to Step 205 are performed.

Here, the processes subsequent to Step 205 are the same as the processes subsequent to Step 106 described above, and the receipt recognizing unit 22 of the server apparatus 20 first performs a recognition process of the respective receipts (Step 205). Accordingly, the data are divided into image data for respective receipt.

Subsequently, the registration processing unit 24 of the server apparatus 20 associates the respective image data obtained by the division process in Step 205 with the expense item information acquired from the portable terminal of the user, and performs the registration process of the image data and the expense item information (Step 206). Thereafter, the logout process is lastly performed in the server apparatus 20 (Step 207).

Here, since the expense item information is acquired from the QR code attached to the clear file in the process illustrated in FIG. 5, the user has to prepare clear files for each different expense item. Meanwhile, since the expense item information is acquired from the portable terminal in the process illustrated in FIG. 8, the user can reduce the number of clear files to be prepared.

In addition, a case where the expense item information, the user name, the user ID, and the password are acquired by the portable terminal without using the QR code is described in the process of FIG. 8. However, a portion of information may be acquired from the QR code by storing a portion of the expense item information, the user name, the user ID, and the password in the QR code together with attaching the QR code to a clear file.

However, in any of the cases, the password is not included in the QR code in view of security enhancement, and it is desirable that the password be acquired directly from the user through the UI unit 106, or acquired from a portable terminal.

Figure 9:
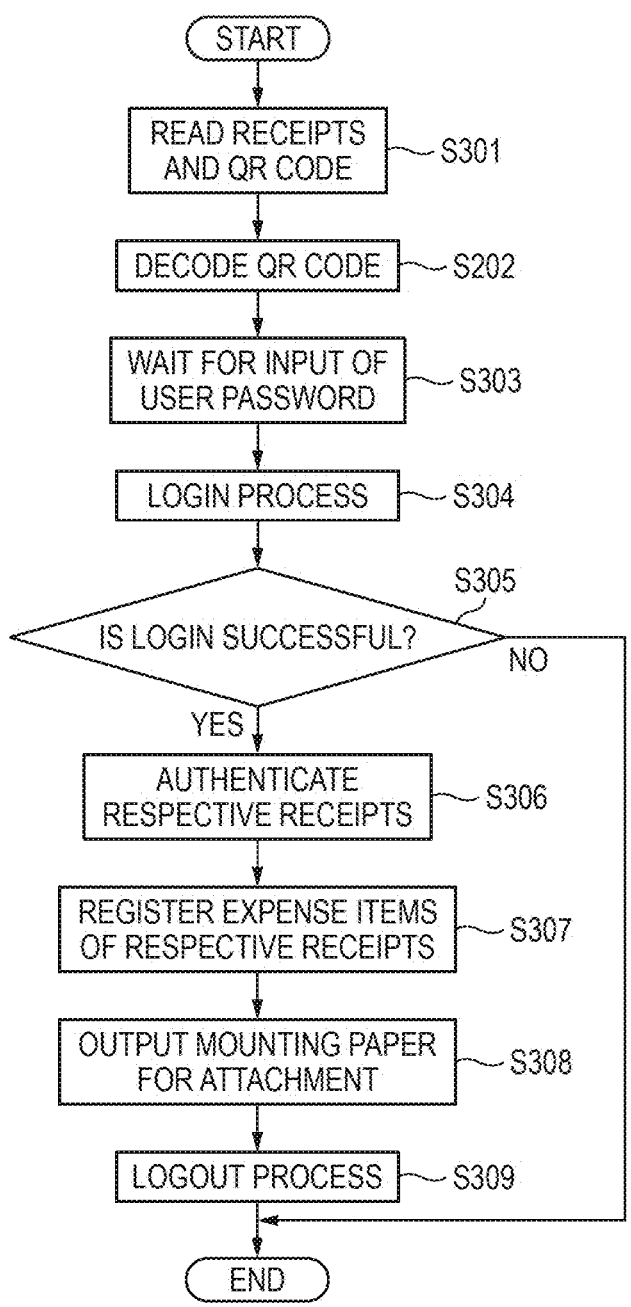
FIG. 9 is a diagram illustrating another process example in the receipt managing system.

FIG. 9 is a diagram illustrating another process example in the receipt managing system 1.

In the process example, as in the process described in FIG. 5, the receipt and the QR code are read in a state in which the receipts are received in the clear file to which the QR code is attached (Step 301), and the image data obtained through the reading are transmitted to the server apparatus 20.

Subsequently, as in Steps 102 to 105, the server apparatus 20 first decodes the QR code (Step 302), and the expense item information, the user name, and the user ID are acquired. Subsequently, the image forming device 10 waits for the input of the password by the user (Step 303). Then, if the password is input, the password is transmitted to the server apparatus 20, and the server apparatus 20 performs the login process (Step 304).

Then, if the login process fails (No in Step 305), the process ends as it is, and if the login process is successful (Yes in Step 305), the processes subsequent to Step 306 are performed.

In the process of Step 306, as described above, the recognition process of the respective receipts is performed, and the image data are divided so that image data for respective receipts are generated. Subsequently, the plural respective image data obtained by the division process of Step 306 are associated with the expense item information, and then the registration process of the image data and the expense item information is performed (Step 307).

Subsequently, in the process example, the image forming unit 109 of the image forming device 10 as an example of an mounting paper generation unit (see FIG. 2) outputs the mounting paper (hereinafter, referred to as a "mounting paper for attachment") to which the receipt (the original copy of the receipt) is attached (Step 308), and the server apparatus 20 performs the logout process as described above, thereafter (Step 309).

Figure 10:
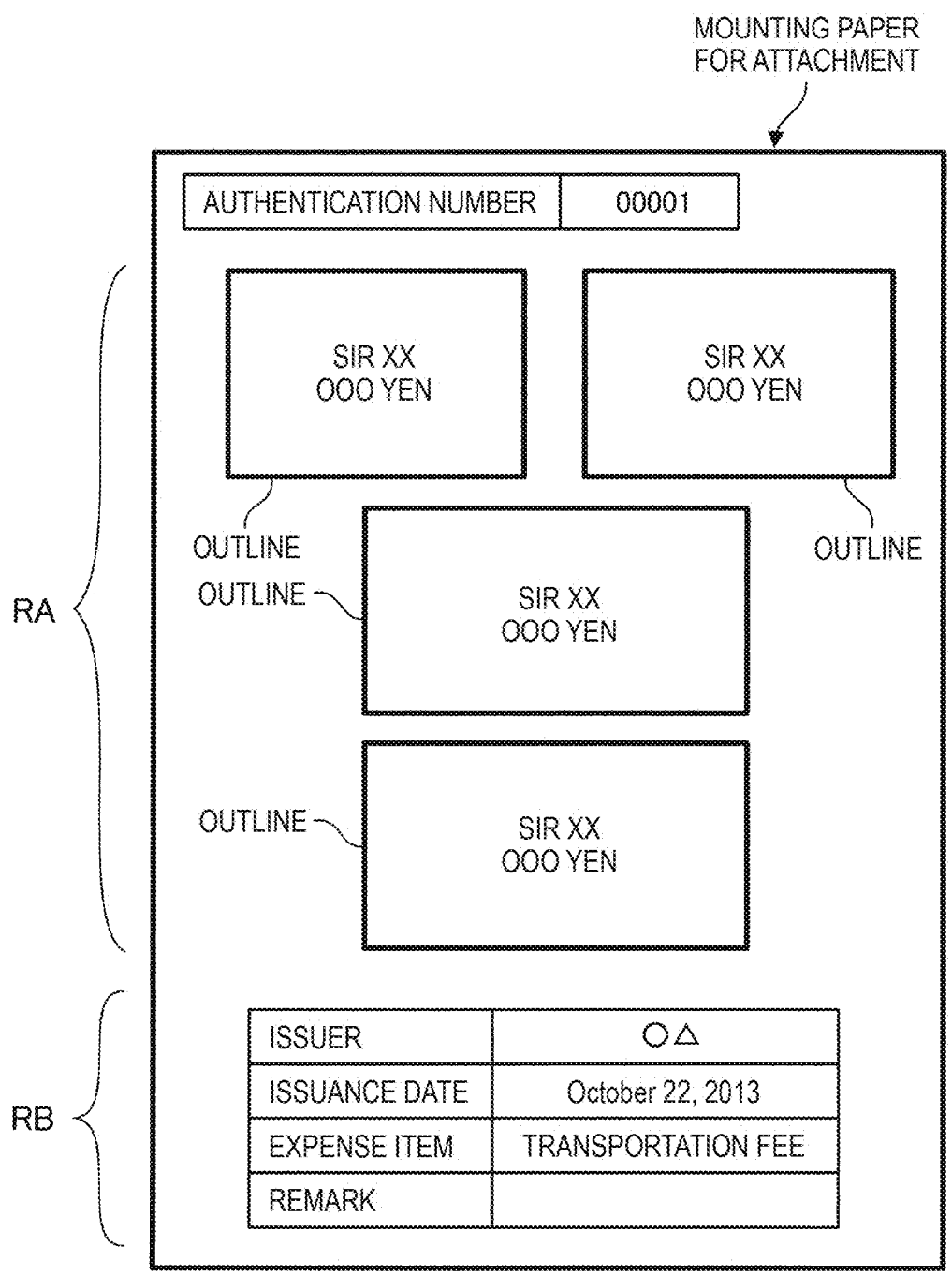
FIG. 10 is a diagram illustrating an example of a mounting paper for attachment which is output by an image forming device.

FIG. 10 is a diagram illustrating an example of the mounting paper for attachment which is output by the image forming device 10.

The receipts owned by the user (the original copy of the receipt) are generally submitted to a predetermined submission location, and are attached to the mounting paper for attachment illustrated in FIG. 10 and then submitted according to the embodiment. A receipt pasting area RA and an information description area RB are provided in the mounting paper for attachment as illustrated in FIG. 10.

An issuer name is recorded in the information description area RB. In addition, the issuer name is the same as the user name obtained by decoding the QR code. Additionally, an issuance date (an issuance date of the mounting paper for attachment) and the expense item information are recorded in the information description area RB.

In the pasting area RA of the receipt, the images based on the image data for the respective receipts obtained by the division process of Step 306 described above are printed, and rectangular outlines that enclose the respective images are printed.

When such mounting paper for attachment is output, the user can quickly recognize the attachment positions of the receipts owned by themselves. In addition, herein, a case where the image based on the image data is printed in the actual size is described, but the printing may be performed in a state in which the image is reduced into a thumbnail image or the like. However, also in this case, it is desirable the outlines be printed in an original size without reducing the size thereof.

Additionally, the image data of a portion or all of the receipts may be printed on the mounting paper for attachment after being rotated by 90°, or being shifted. According to the sizes or the number of the receipts, not all of the receipts may be settled in the mounting paper for attachment. If the image data of the receipts are rotated by 90° or shifted, the number of receipts that can be attached to the mounting paper for attachment increases.

In addition, the image data which are sources of the mounting paper for attachment may be generated by the server apparatus 20 and be transmitted to the image forming device 10, or the image data and the user name for each receipt may be transmitted from the server apparatus 20 to the image forming device 10 and the image data which are sources of the mounting paper for attachment may be generated in the image forming device 10.

Other Embodiments

Information on an authorizer that performs an authorization relating to the receipt may be stored in the QR code described above. More specifically, for example, an e-mail address of the authorizer can be stored. Then, in this case, the read data and the expense item information of the receipts are stored in the server apparatus 20, and an e-mail for requesting an authorization of the receipt is transmitted from the server apparatus 20 to the computer apparatus 30 operated by the authorizer (see FIG. 1). Then, in this case, the authorizer can check the content of the receipt by accessing the server apparatus 20 through the computer apparatus 30.

Additionally, in the above, a case where the read data of the receipt are stored only in the server apparatus 20 is described, but information such as the issuance date of the receipt, the issuer of the receipt, and the amount of money of the receipt may be acquired by performing the OCR process on the read data of the receipt. Additionally, if the issuance date of the receipt, the issuer of the receipt, the amount of money of the receipt, and the like are acquired in this manner, the information may be printed in the information description area RB of the mounting paper for attachment illustrated in FIG. 10. Additionally, the total amount of money of the receipt may be calculated, and the total amount of money may be printed in the information description area RB of the mounting paper for attachment.

Additionally, in the above, a case where the decoding process and the recognition process of the receipt (the division process of the image data) are performed in the server apparatus 20 is described as an example, but any one or both of the decoding process and the recognition process may be performed in the image forming device 10.

Additionally, in the above, a case where the receipts are arranged for each expense item is described as an example, but an aspect in which receipts are arranged, for example, for each business trip can be considered. For example, according to the user, accommodation fees, parking fees, fees for attending a meeting and the like are generated in one business trip, and the user may desire to arrange and treat these by grouping in some cases. In this case, for example, not the expense item information, but the information such as the date of the business trip is stored in the QR code, and the QR code and the receipt are read. Then, in this case, in a state in which the information such as the date of the business trip is associated with the image data of each receipt, the image data and the information such as the date of the business trip are stored in the server apparatus 20.

Additionally, information relating to the transmission destination of the read image (the transmission destination URL, the IP address, a FAX number, and the like) may be included in the QR code. In this case, when the image is read, the image forming device 10 (automatically) recognizes the transmission destination, and the image data can be transmitted to the corresponding transmission destination. In this case, the user themselves does not have to designate the transmission destination, and the user merely scans the clear file.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management system comprising:
    an image reading unit configured to read images of a plurality of documents and generate read image data of the plurality of documents;
    an image data dividing unit configured to divide the read image data and generate image data for respective documents included in the plurality of documents;
    an information acquisition unit configured to acquire information relating to the plurality of documents; and
    a process unit configured to associate the information acquired by the information acquisition unit with the respective image data for the respective documents;
    wherein the reading of the images of the plurality of documents by the image reading unit is performed in a state in which the plurality of documents are fixed to a sheet-shaped base material; and
    wherein a color of the plurality of documents is different from a color of the sheet-shaped base material.

2. The document management system according to claim 1,
    wherein the image reading unit is further configured to read an information storing image in which information is stored and to generate read image data of the information storing image, and
    wherein the information acquisition unit is configured to acquire the information relating to the plurality of documents from the read image data of the information storing image.

3. The document management system according to claim 1,
    wherein the information acquisition unit is configured to acquire the information relating to the plurality of documents from a terminal operated by an operator who instructs to perform the reading of the images of the plurality of documents.

4. The document management system according to claim 1, further comprising:
    a mounting paper generation unit configured to generate mounting paper to which the plurality of documents are attached;
    wherein the mounting paper generation unit is configured to form images based on the image data for the respective document on the mounting paper.

5. The document management system according to claim 2,
    wherein the information storing image includes information for authentication used in the authentication of an operator who instructs to perform the reading of the plurality of documents.

6. The document management system according to claim 2,
    wherein the information storing image includes information on an authorizer who performs an authorization with respect to the plurality of documents.

7. A document management device comprising:
    an image data dividing unit configured to divide read image data of a plurality of documents read in a state in which the plurality of documents are fixed to a sheet-shaped base material
        wherein the image data dividing unit is configured to generate image data for respective documents included in the plurality of documents;
    an information acquisition unit configured to acquire information relating to the plurality of documents; and
    a process unit configured to associate the information acquired by the information acquisition unit with the respective image data for the respective documents;
    wherein a color of the plurality of documents is different from a color of the sheet-shaped base material.

8. The document management device according to claim 7,
    wherein the information acquisition unit is configured to acquire the information relating to the plurality of documents from read image data of an information storing image in which information is stored.

9. The document management device according to claim 7,
    wherein the information acquisition unit is configured to acquire the information relating to the plurality of documents from a terminal operated by an operator who instructs to perform reading of the images of the plurality of documents.

10. A non-transitory computer readable medium storing a program for causing a computer to execute a process for document management, the process comprising:
dividing read image data of a plurality of documents read in a state in which the plurality of documents are fixed to a sheet-shaped base material;
generating image data for respective documents included in the plurality of documents;
acquiring information relating to the plurality of documents; and
associating the acquired information with the respective image data for the respective documents;
wherein a color of the plurality of documents is different from a color of the sheet-shaped base material.

11. The non-transitory computer readable medium according to claim 10, the process further comprising:
acquiring the information relating to the plurality of documents from read image data of an information storing image in which information is stored.

12. The non-transitory computer readable medium according to claim 10, the process further comprising:
acquiring the information relating to the plurality of documents from a terminal operated by an operator who instructs to perform reading of the images of the plurality of documents.

\* \* \* \* \*